United States Patent [19]

Steuer

[11] 4,350,491

[45] Sep. 21, 1982

[54] CONE-PULLEY BELT-TYPE TRANSMISSION

[75] Inventor: Herbert Steuer, Bad Homburg, Fed. Rep. of Germany

[73] Assignee: P.I.V. Antrieb Werner Reimers GmbH & Co. KG, Bad Homburg, Fed. Rep. of Germany

[21] Appl. No.: 125,250

[22] Filed: Feb. 27, 1980

[30] Foreign Application Priority Data

Mar. 17, 1979 [DE] Fed. Rep. of Germany ....... 2910546

[51] Int. Cl.$^3$ ............................................. F16H 55/56
[52] U.S. Cl. ........................................ 474/12; 474/17; 474/28
[58] Field of Search ....................... 474/17, 18, 19, 12, 474/28, 29, 30

[56] References Cited

U.S. PATENT DOCUMENTS 3,596,528 8/1971 Dittrich et al. ........................ 474/12
4,116,080 9/1978 Berens .................................. 474/28

FOREIGN PATENT DOCUMENTS 1264196 3/1964 Fed. Rep. of Germany.
1816949 1/1971 Fed. Rep. of Germany.

*Primary Examiner*—Kenneth Dorner
*Attorney, Agent, or Firm*—Spencer & Kaye

[57] ABSTRACT

An infinitely variable cone-pulley, belt-type transmission having at least two cone-pulley pairs each mounted on a respective shaft, with one axially displaceable cone-pulley of each pair being formed as a rotating pressure cylinder of a piston firmly connected with the associated shaft, and the pressure application forces are generated hydraulically in the cylinder in dependence upon load and transmission ratio. Such transmissions are further provided with a transmission ratio setting member and a control slide valve coupled therewith which distributes the pressure fluid to the pressure cylinders, at least one adjustable pressure control valve controlling the application pressure, in dependence on load and transmission ratio, in the return conduit of the control slide valve for the hydraulic pressure necessary on the drive-output side of the transmission. The pressure control valve is mounted to rotate with one shaft and includes a valve body which is actuatable by a movable intermediate member, e.g. a ball, which rests against a substantially axially extending wedge face of a V-shaped groove of the axially displaceable cone-pulley mounted on the same shaft. The control valve is mounted in the piston of that axially displaceable cone-pulley and the V-shaped groove is disposed on the outer circumferential surface of an axially extending neck portion of that cone-pulley which is enclosed by the piston or on the inner cylindrical surface of an axially extending portion of the cone-pulley which surrounds the piston and defines the rotating pressure cylinder wall.

4 Claims, 5 Drawing Figures

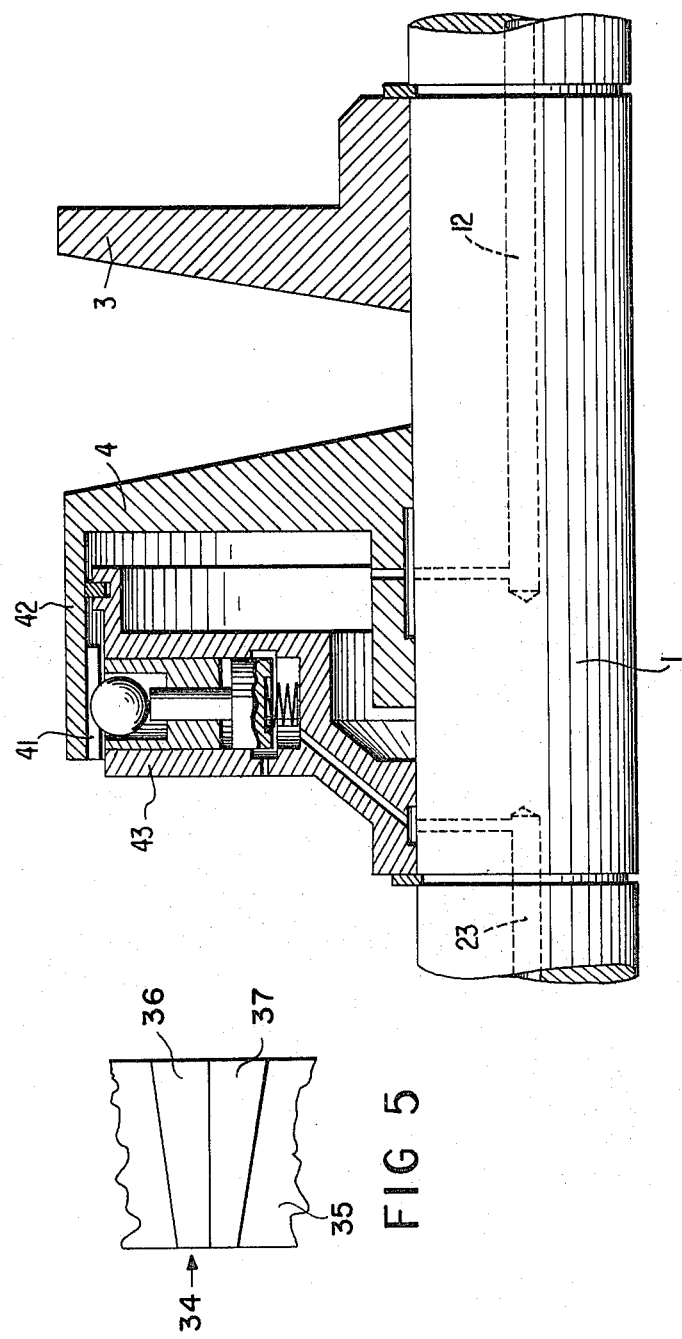

4,350,491

CONE-PULLEY BELT-TYPE TRANSMISSION

BACKGROUND OF THE INVENTION

The present invention relates to an infinitely variable cone-pulley, belt-type transmission of the type having at least two cone-pulley pairs.

In known transmissions of this type, one axially displaceable cone-pulley of each pair is formed as a rotating pressure cylinder of a piston firmly connected with the associated shaft, and the pressure application forces are generated hydraulically in the cylinder in dependence upon load and transmission ratio. Such transmissions are further provided with a transmission ratio setting member and a control slide valve coupled therewith which distributes the pressure fluid to the pressure cylinders, at least one adjustable pressure control valve controlling the application pressure, in dependence upon load and transmission ratio, in the return conduit of the control slide valve for the hydraulic pressure necessary on the drive-output side of the transmission. The pressure control valve, to which the pressure medium flows by way of a branch of an axially parallel bore in the associated shaft, is arranged on the drive-input and/or drive-output side of the transmission and is mechanically adjustable in dependence upon the torque transmitted on the corresponding transmission side and upon the axial position of the relevant displaceable cone-pulley. The pressure control valve body is actuatable by a movable intermediate member, e.g. a ball, which rests against a substantially axially parallel wedge face of a V-shaped groove of the associated axially displaceable cone-pulley, and the inclination of the wedge face varies over its axial length for the transmission ratio-dependent influencing of the pressure control valve.

Transmissions of this type are described in FRG Pat. No. 1,816,949 and corresponding U.S. Pat. No. 3,596,528. The pressure control valves described therein are radially displaceably arranged with their valve body in the associated shafts while the ball forming the intermediate member extends into a V-shaped groove which is arranged axially parallel with the shaft in the neck of the associated axially displaceable cone-pulley.

It has been found that this accommodation of the pressure control valve in the shaft together with the associated passages for the pressure fluid raises technological problems relating to manufacture and maintenance of the desired pressure levels. The thickness of the shaft limits the possibility of accommodating the radial sliding seat for the valve body there without the danger of weakening the bearing cross-section of the shaft. The same applies to the various pressure fluid conduits. Likewise it is complicated to manufacture the V-shaped groove for the valve ball in the interior of the hub of the axially displaceable cone-pulley. The valve body of the pressure control valve must here have the smallest possible diameter, so that the pressure oil forces acting at the end upon it must be relatively high in order to bring about the desired control function.

These difficulties could be counteracted by giving the respective shaft a correspondingly larger diameter. This, however, would entail an unnecessary expenditure for material and would increase the total mass to be moved.

SUMMARY OF THE INVENTION

It is an object of the present invention to improve the accommodation of the pressure control valve in a transmission of the type described above.

A further object of the invention is to simplify the structure and manufacture of such valve.

Another object of the invention is to improve the pressure control achieved by such valve.

The improvements according to the invention are essentially achieved by arranging the pressure control valve in the piston of the associated cylinder-piston unit and locating the V-shaped groove having the wedge face on the outer circumference of the neck of the displaceable cone-pulley or on the inside of the cylinder jacket connected with it.

An advantage of the invention is that it serves to place the pressure control valve at a considerably greater distance from the axis of rotation of the respective pulley assembly, whereby considerably more space is available, especially for the radial bore for the accommodation of the valve body. Moreover, the V-shaped groove for the ball actuating the valve body can be placed on the outside of the neck of the displaceable cone-pulley or on the inner circumference of the cylinder jacket connected with this cone-pulley, which is considerably more favorable with respect to manufacturing considerations.

Finally, the possibility exists of arranging several pressure control valves working in parallel in distribution on the circumference in the relevant piston firmly connected with the shaft, whereby the effective piston area can be further increased. This is particularly significant with respect to pressure considerations.

BRIEF DESCRIPTION OF THE DRAWING

FIG. 4 is a generally cross-sectional detail view of another embodiment of the transmission according to the invention.

FIG. 5 is a fragmentary plan view of a detail of element 35 of FIG. 2, in the direction of arrow V of FIG. 2.

DESCRIPTION OF THE PREFERRED EMBODIMENTS

Figure 1:
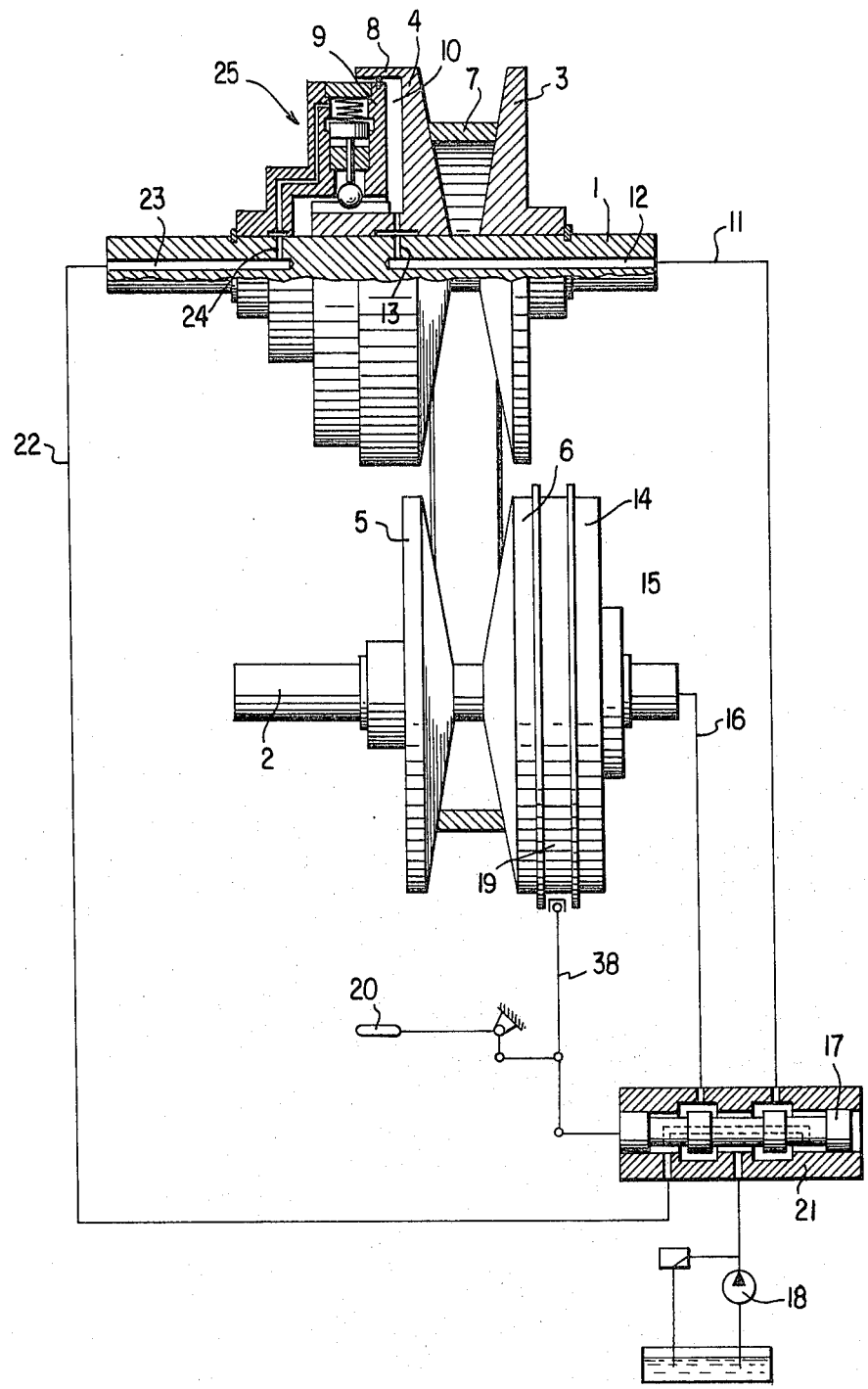
FIG. 1 is an elevational view, partly in cross section, of one preferred embodiment of a cone-pulley belt-type transmission according to the invention.

The transmission illustrated in FIG. 1 includes a drive-input shaft 1 and a drive-output shaft 2. A pair of cone-pulleys 3 and 4 is arranged on the drive-input shaft 1 and a pair of cone-pulleys 5 and 6 on the drive-output shaft 2 and a transmission element 7 in the form of an endless belt or chain is disposed to circulate between these pulley pairs. The cone-pulley 4 is formed as an axially displaceable pressure cylinder having a jacket or sleeve 8 for receiving a pressure piston 9 fast on, i.e. fixed axially and rotationally to, the shaft 1, so that a pressure chamber 10 is formed between cone-pulley 4 and piston 9. Pressure oil can be conducted into chamber 10 to produce the requisite application pressure upon the transmission means 7, the oil being delivered through a conduit 11, and an axial bore 12 and a radial bore 13 in shaft 1.

Likewise the cone pulley 6 with a jacket 14 forms a similar pressure cylinder for a shaft-fast piston 15, only the collar of piston 15 seated on the shaft 2 being visible in FIG. 1. Pressure fluid passes to this pressure cylinder likewise through a conduit 16 and a shaft bore (not shown).

The conduits 11 and 16 are connected to a control slide valve having a control piston 17 provided with four control edges to distribute pressure oil, fed to it by a pump 18, to the conduits 11 and 16 according to the control piston setting. Displacement of the four-edged control piston 17 is effected in a known manner by a control lever 38 having one end articulated to the piston and its other end seated in a circumferential groove 19 on the axially displaceable cone-pulley 6 to maintain its transmission ratio of the transmission. The piston 17 is otherwise displaceable by operation of a hand lever 20 for intentional variation of the transmission ratio.

According to the known operating principles of cone-pulley belt-type transmissions of the kind illustrated in FIG. 1, at a set transmission ratio, i.e. a given position for lever 20, the transmission is in a state of equilibrium when the pressure prevailing in the cylinder chamber 10 of the drive shaft 1 exceeds by a specific amount that in the cylinder chamber on the shaft 2. The four-edged control valve 17 accordingly assumes a position such that the pressure medium flowing from its housing 21 through the conduit 22 is at the hydraulic pressure prevailing on the drive-output side of the transmission, that is in the cylinder defined by jacket 14, in accordance with the construction of the four-edged control slide valve as illustrated.

This outflowing pressure medium passes by way of the conduit 22 on the side opposite to the conduit 11, through an axial bore 23 into the shaft 1 and thence through a radial bore 24 into the piston 9 firmly connected with the shaft 1. Within piston 9 there is disposed at least one pressure control valve 25 for establishing the requisite hydraulic pressure in the cylinder chamber on the drive-output shaft 2.

Figure 3:
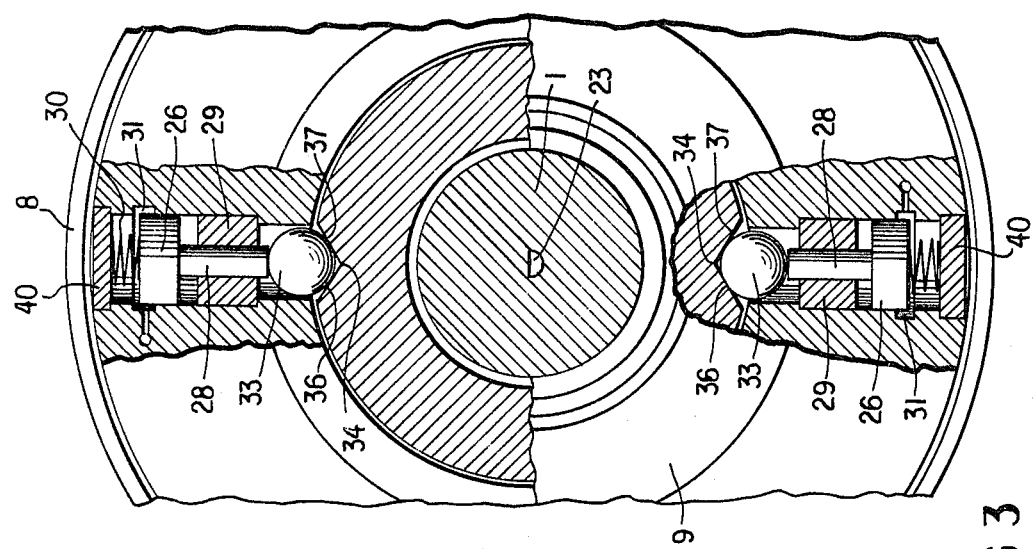
FIG. 3 is an axial cross-sectional view along the section line III—III of FIG. 2.
Figure 2:
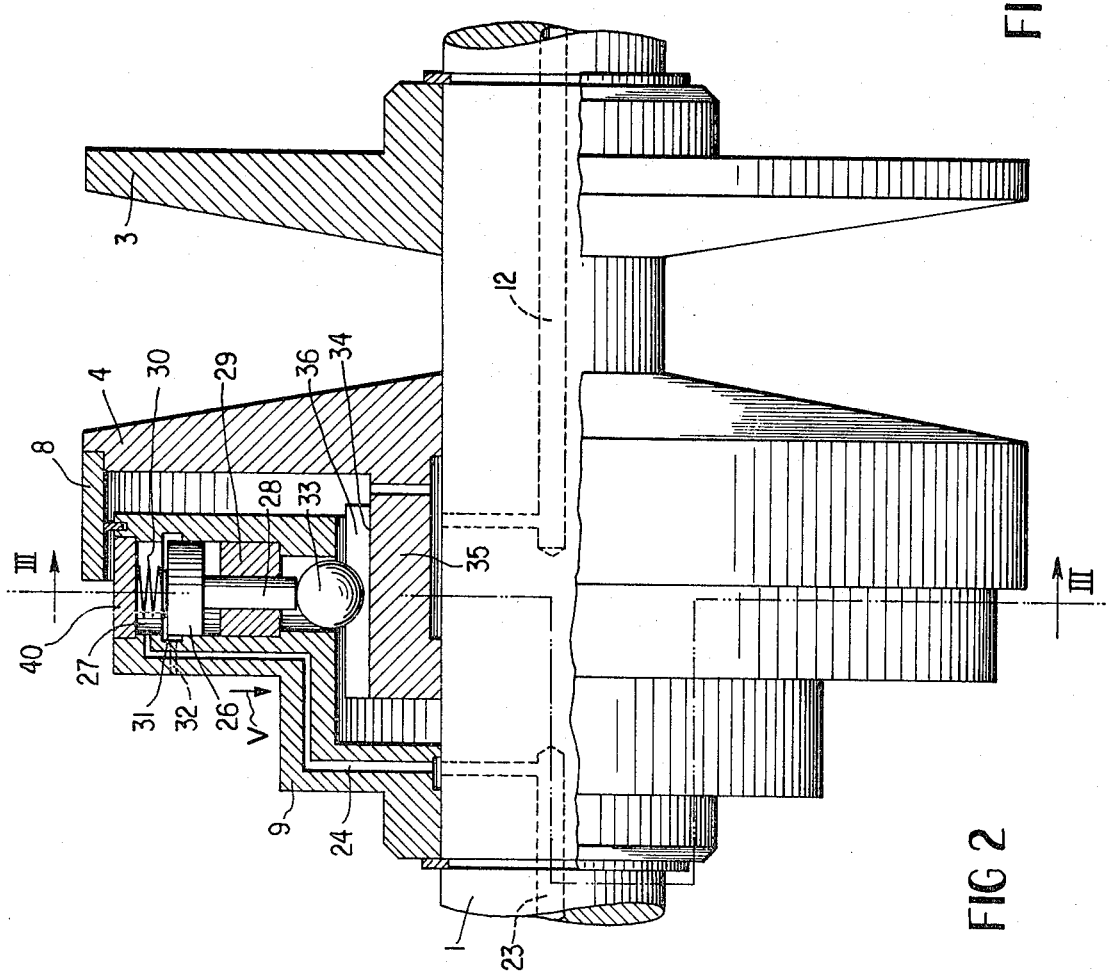
FIG. 2 is a detail view, to an enlarged scale of the portion of FIG. 1, which is shown in cross section.

This pressure control valve 25 is shown in greater detail in FIGS. 2 and 3, where it can be seen that the valve body 26 of this pressure control valve is situated in a radial bore 27 of the stationary piston 9 and constitutes essentially a piston which is radially movable in relation to the shaft 1. Body 26 which carries a piston rod 28 which is guided in a stopper 29 of the bore 27. At the side of body 26 opposite to the piston rod 28, the body 26 is subject to the action of a compression spring 30 which in turn is supported against a closure lid 40 closing the outer end of bore 27. This spring 30 performs no active function but serves merely to hold the piston 26 in abutment, with a slight force, against the other valve components to be described below. With appropriate design, however, the spring 30 can act to maintain a specific basic pressure in the system.

Bore 27 is provided with an annular groove 31 and a bore 32 extending from groove 31 to a region communicating with the suction, or low pressure, side of pump 18.

The pressure medium flowing in the bore 24 of the piston 9 from the conduit 22 and the axial bore 23 flows to the bore 27 above the piston 26, from which it flows through the passage between piston 26 and the upper edge of the annular groove 31 and then through bore 32 of the wall of the piston 9 to the pressureless condition, that is to say to the suction, or low pressure, side of the pump 18. Piston 26 forms a control edge with the upper edge of groove 31 and the position of piston 26 along the axis of bore 27 determines the width, and hence the flow resistance, of the path defined by that control edge, and therefore influences the hydraulic pressure in valve 25, and more specifically in bore 27.

Piston 9 is connected to shaft 1 to rotate as a unit therewith and movement of piston 9 in the direction of the axis of shaft 1 away from pulley 4 is prevented by a retaining ring secured to shaft 1 and visible at the left side of FIG. 2. Pulley 4, and its associated neck 35, on the other hand, is mounted to be rotatable and axially movable relative to shaft 1 and transmission of torque between shaft 1 and pulley 4 is effected via an axially extending V-shaped groove 34 in the outer peripheral wall of neck 35 and a ball 33 held by piston 9 and urged against groove 34 by piston rod 28.

The setting of the axial position of piston 26 in bore 27 is effected in dependence upon the torque between shaft 1 and pulley 4 and the transmission ratio setting by means of the ball 33 against which, on the one hand, the piston rod 28 bears under the action of the pressure-medium pressure prevailing in the chamber 27, and spring 30, and which, on the other hand, in turn, lies in V-shaped groove 34 extending axially parallel to shaft 1 in the outer wall of neck 35 of the axially displaceable cone-pulley 4. Thus the outwardly directed radial force upon the piston rod 28, generated by the torque, is in equilibrium with the inwardly directed radial force generated by the pressure in the bore 27 upon the surface of the piston 26. The groove 34 has inclined flanks 36 and 37, the inclination of these flanks 36 and 37 varying in a known manner over the axial extent of the V-shaped groove, as shown in the fragmentary plan view of FIG. 5, to coordinate the torque response of the valve to the transmission ratio setting of the transmission.

The transmission of torque between shaft 1 and cone-pulley 4 takes place through the ball 33 and its engagement with the V-shaped groove 34, in that the ball is pressed by means of the piston rod 28, the piston 26 and the hydraulic pressure acting upon its upper side into the V-shaped groove 34. On the other hand, the torque to be transmitted between ball 33 and cone-pulley 4 shifts the radial position of the ball 33 relative to groove 34 somewhat, according to the magnitude of the torque, moving ball 33 along one of the inclined flanks 36 and 37 to again effect a torque-proportional setting of the piston 26 in relation to the annular groove 31 and thus a corresponding constriction of the pressure oil return flow to attain the pressure necessary on the drive-output side of the transmission.

FIG. 3 shows an embodiment provided with two pressure control valves disposed diametrically opposite one another in relation to the axis of the shaft 1, the two pressure control valves always working in the same direction relative to their associated bores 27.

The embodiment shown in FIG. 4 differs from those shown in FIGS. 1 to 3 merely in that the V-shaped groove 41 is provided at the inner cylindrical wall of the cylinder jacket 42 fixed to cone-pulley 4 and the associated control piston ball projects outwardly, so that, naturally, a reversal of the orientation of the entire pressure control valve results, the arrangement of which valve in the piston 43 does not need to be explained again in view of its structural identity to valve 25.

In the transmission as thus described with reference to FIGS. 1 to 4, especially FIG. 1, the pressure control valve or valves are arranged only on the drive-input shaft 1. Thus this involves a transmission in which shaft 1 always constitutes the drive-input side and shaft 2 always constitutes the drive-output side. Furthermore, the flanks 36 and 37 of the V-groove 34 can have identical inclination at points opposite to one another in the circumferential direction, so that this transmission is further suitable equally for both directions of rotation.

In the case of a transmission which is to permit a reversal in the direction of torque transmission, i.e. an interchange of the drive-input and drive-output sides, pressure control valves having the described form are equally arranged on both transmission sides. For this purpose, an additional fluid-flow connection must be provided from the conduit 22 to the control valve or valves of shaft 2 in the same manner as disclosed with reference to the shaft 1 and provision must be made, by a pressure medium pressure-actuated changeover switch, so that the pressure control valves arranged in each case on the drive-input side communicate with the cylinder chamber of the drive-output side. Such a pressure changeover switch, the changing over of which is effected in each case by the higher hydraulic pressure prevailing on the drive-input side, is disclosed, for example, in FRG Pat. No. 1,264,196, and is described therein.

Finally, it should also be mentioned that embodiments of the present invention can be constructed so that the pressure control valves arranged on the drive-input side are effective. This has proved to be the more expedient form of construction. It is of course also possible however analogously to reverse the arrangement so that in each case the pressure control valves on the drive-output side are effective, as is disclosed in the above-cited FRG Pat. No. 1,816,949 and corresponding U.S. Pat. No. 3,596,528.

It will be understood that the above description of the present invention is susceptible to various modifications, changes and adaptations, and the same are intended to be comprehended within the meaning and range of equivalents of the appended claims.

What is claimed is:

1. In an infinitely variable cone pulley transmission having driving and driven shafts, at least two cone pulley pairs each on a respective shaft, with one pulley of each pair being axially movable and rotatable relative to its associated shaft and having an axially projecting portion defining a rotating hydraulic cylinder, two pistons each mounted on a respective shaft to rotate as a unit therewith and inserted within the hydraulic cylinder of the one pulley on its associated shaft to define a hydraulic fluid chamber, a transmission element connected to circulate between the pulley pairs for transmitting power between the shafts, hydraulic fluid supply means including a source of hydraulic pressure fluid, fluid delivery passages communicating with the two hydraulic fluid chambers, a hydraulic fluid return passage communicating with a low pressure hydraulic fluid receiving region, a control slide valve connected between the source of hydraulic pressure fluid and the fluid delivery passages for controlling the hydraulic pressure in each chamber which determines the force with which the associated pulley pair bears against the transmission element, a transmission ratio setting member coupled to the slide valve for setting the transmission ratio between the shafts, a pressure control valve communicating with the fluid return passage and mounted on one of the shafts to rotate therewith and being adjustable in dependence on the torque between the shaft on which it is mounted and the one pulley of the pair on that shaft, and means including an axially extending bore in the one of the shafts for supplying the pressure control valve with hydraulic fluid at the pressure in the hydraulic fluid chamber of the cylinder associated with the driven shaft for causing the pressure control valve to control the pressure in that chamber in dependence on the set transmission ratio and the mechanical load on the transmission, the pressure control valve being composed of a member defining a pressure control cylinder communicating with the axially extending bore in the one of the shafts and with the fluid return passage, a valve body movable in the pressure control cylinder for varying the flow path defined by the flow control valve between the chamber of the cylinder associated with the driven shaft and the low pressure hydraulic fluid receiving region, a movably mounted intermediate member for moving the valve body, and means defining a V-shaped groove in the axially projecting portion defining the rotating hydraulic cylinder associated with the shaft on which the pressure control valve is mounted, the V-shaped groove extending parallel to the axis of that shaft and contacting the intermediate member for moving the valve body in response to rotation of the shaft on which the pressure control valve is mounted relative to the axially projecting portion defining the cylinder associated with that shaft, the improvement wherein said member defining said pressure control cylinder is mounted in said piston which is mounted on the same shaft as said pressure control valve and said V-shaped groove is disposed in an axially extending surface of its associated axially projecting portion.

2. An arrangement as defined in claim 1 wherein said associated axially projecting portion is located between said piston in which said pressure control cylinder is mounted and its associated shaft, and said V-shaped groove is disposed in the outer circumferential surface of said projecting portion.

3. An arrangement as defined in claim 1 wherein said associated axially projecting portion encloses said piston in which said pressure control cylinder is mounted and said V-shaped groove is disposed in the inner cylindrical surface of said projecting portion.

4. An arrangement as defined in claim 1, 2 or 3 wherein said inclined V-shaped groove is provided with inclined side walls which vary in inclination along the length of said groove in a manner to cause movement of said valve body to be dependent on the axial position of said one pulley on said one of said shafts relative to that shaft such that the pressure control effected by said pressure control valve is a function of the transmission ratio setting.

* * * * *